(12) United States Patent
Heidrich et al.

(10) Patent No.: US 8,861,851 B2
(45) Date of Patent: Oct. 14, 2014

(54) COLOR HIGHLIGHT RECONSTRUCTION

(75) Inventors: Wolfgang Heidrich, Vancouver (CA); Mushfiqur Rouf, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 211 days.

(21) Appl. No.: 13/463,775

(22) Filed: May 3, 2012

(65) Prior Publication Data

US 2012/0288192 A1 Nov. 15, 2012

Related U.S. Application Data

(60) Provisional application No. 61/486,228, filed on May 13, 2011.

(51) Int. Cl.
*G06K 9/00* (2006.01)
*G06T 5/00* (2006.01)

(52) U.S. Cl.
CPC ....... *G06T 5/005* (2013.01); *G06T 2207/10024* (2013.01); *G06T 2207/20036* (2013.01)
USPC ........... 382/167; 382/162; 382/274; 348/645; 348/609

(58) Field of Classification Search
CPC ........... G06K 9/36; G06T 2207/10024; G06T 2207/20036; G06T 5/001; G06T 5/005; G06T 5/008; H04N 1/60; H04N 9/68; H04N 9/646
USPC .......... 382/162, 167, 560, 274, 254; 348/645, 348/609, 646, 647, 649, 353, 612
See application file for complete search history.

(56) References Cited

U.S. PATENT DOCUMENTS

| 6,163,346 | A   | * | 12/2000 | Tsyrganovich | ............... | 348/607 |
| 7,079,675 | B2  | * | 7/2006  | Hamer et al. | ................. | 382/128 |
| 7,146,059 | B1  | * | 12/2006 | Durand et al. | ................ | 382/260 |
| 7,423,696 | B2  | * | 9/2008  | Samadani et al. | ........... | 348/645 |
| 7,466,857 | B2  |   | 12/2008 | Nishi et al. | | |
| 7,593,603 | B1  |   | 9/2009  | Wilensky | | |
| 7,945,107 | B2  | * | 5/2011  | Bae et al. | ...................... | 382/254 |
| 8,243,191 | B2  | * | 8/2012  | Uchida | ......................... | 348/353 |
| 2007/0269104 | A1 | * | 11/2007 | Whitehead et al. | ........... | 382/162 |
| 2009/0034834 | A1 | * | 2/2009  | Friedhoff et al. | ............. | 382/162 |
| 2009/0252410 | A1 | * | 10/2009 | Chu Ke | .......................... | 382/167 |
| 2010/0165139 | A1 | * | 7/2010  | Muijs et al. | ................. | 348/222.1 |
| 2010/0315514 | A1 | * | 12/2010 | Uchida | ......................... | 348/187 |
| 2012/0176399 | A1 | * | 7/2012  | Whitehead et al. | ........... | 345/589 |

FOREIGN PATENT DOCUMENTS

JP 2009105632 A * 5/2009 ............... H04N 9/64

OTHER PUBLICATIONS

Coffin, Dave, "Decoding Raw Digital Photos in Linux", May 2012 (updated from an original document from as early as 2004).
Coffin, Dave, "Decoding Raw Digital Photos in Linux".
Zhang, X., et al., "Estimation of Saturated Pixel Values in Digital Color Imaging", Journal of the Optical Society of America, vol. 21, Issue 12, pp. 2301-2310, 2004 (Abstract).
Masood, S., et al., "Automatic Correction of Saturated Regions in Photographs Using Cross-Channel Correlation", Pacific Graphics, vol. 28, No. 7, 2009.

\* cited by examiner

*Primary Examiner* — Mekonen Bekele

(57) ABSTRACT

Methods and apparatus may be applied to reconstruct pixel values in saturated regions of an image. Saturated regions are identified and hues for pixels in the saturated regions are estimated based on hues in boundaries of the saturated regions. Gradients for pixel values in saturated color channels within the saturated region may be estimated based on known gradients for non-saturated color channels. Reconstructed pixel values may be derived from the estimated gradients. The methods and apparatus may be applied in conjunction with dynamic range expansion.

49 Claims, 5 Drawing Sheets

COLOR HIGHLIGHT RECONSTRUCTION

CROSS REFERENCE TO RELATED APPLICATION

This application claims priority from U.S. Patent Application No. 61/486,228 filed on 13 May 2011 entitled COLOR HIGHLIGHT RECONSTRUCTION which is incorporated hereby by reference. For the purposes of the United States, this application claims the benefit under 35 U.S.C. §119 of U.S. Patent Application No. 61/486,228 filed on 13 May 2011 entitled COLOR HIGHLIGHT RECONSTRUCTION.

TECHNICAL FIELD

The invention relates to imaging and to image processing. Embodiments of the invention may be applied to reconstructing image highlights in which pixel values in one or more channels are saturated.

BACKGROUND

Color digital imaging devices such as color digital cameras have arrays of sensors that detect light. For example, the sensor arrays may comprise arrays of charge-coupled devices (CCDs), CMOS light sensors, active pixel sensors (APS) or the like. Different sensors are sensitive to light in different spectral regions. Most typically each pixel of a sensor array has sub-pixels that are respectively sensitive to red, green and blue light. During an exposure, each sub-pixel provides an output that is related to the amount of light captured by the sub-pixel. The output from each sub-pixel may be read out from the sensor array and represented as a number. These numbers may be called pixel values. For example, some cameras represent the output of each sub-pixel as an 8-bit number which can have values in the range of 0 to 255.

If the amount of light captured by a sub-pixel of a sensor array exceeds a saturation threshold then the sub-pixel becomes saturated. In this context, "saturation" means that an increase in the intensity of light at the sub pixel does not cause an increase in the pixel value produced by the sub-pixel. For example, where a sub-pixel output is represented as an 8-bit value, light intensity at the saturation threshold may produce a pixel value of 255. If the light intensity is increased above the saturation threshold then the sub-pixel will still produce a pixel value of 255. Saturation may occur as a result of physical properties of sub-pixels of a sensor array, the way in which the output of sub-pixels is encoded as numbers, or some combination thereof.

The hue (color) of a pixel in a digital image is a result of the balance between pixel values in different color channels (e.g. of the relative amounts of red, green and blue detected for the pixel). Hue shifts are one consequence of saturation of one or more color channels. Such hue shifts can very significantly alter the appearance of an image.

Consider the example case where the relative values in the red, green and blue channels are in the ratio R:G:B=1:5:1. Such a pixel will have a green hue. If the pixel is moderately lit then the pixel values for that pixel might be, for example 22:110:22. As the illumination of the pixel becomes more intense the pixel values will increase. When the green channel just saturates the pixel values may be 51:255:51. At this point the hue of the pixel has not changed since the ratio 51:255:51 is the same as 1:5:1. If the intensity is increased further the green channel value remains at 255, its saturated value, and cannot increase any more. Values in the non-saturated red and blue channels can still increase. For some greater intensity, the pixel values may be 111:255:111. Now there has been a hue shift because 111:255:111 is no longer in the ratio 1:5:1. If the intensity of light is increased further then all color channels for the pixel may saturate (e.g. have values 255:255:255) in which case the hue of the pixel, which should be a green hue, has been recorded as being white.

There is a need for ways to process image data to improve the appearance of images having pixels or regions in which one or more color channels are saturated.

SUMMARY OF THE INVENTION

This invention has a range of aspects. One aspect is a method for processing images which include pixels or regions in which one or more color channels are saturated to provide modified images with improved appearance. In some embodiments according to this aspect, the method comprises obtaining estimated hues for a plurality of the pixels in a saturated region within the image, and, based at least in part on the estimated hues, generating reconstructed pixel values to replace saturated pixel values for the plurality of pixels in the saturated region. An estimated hue for a pixel may comprise a hue that is different from a hue indicated by the pixel values of the pixel. Obtaining estimated hues may comprise in-painting hues from a boundary of the saturated region. In some embodiments, in-painting the hues comprises, for each of a plurality of color channels, finding values $\phi(p)$ that optimally satisfy:

$$\nabla^2\phi=0 \text{ over } \Omega \text{ with } \phi|_{\partial\Omega}=f|_{\partial\Omega}$$

where $\partial\Omega$ symbolizes the boundary of the saturated region, $\Omega$ is the set of pixels within the saturated region and $\phi$ represents pixel values for one of the color channels. Values of $\phi(p)$ may be found by applying a fast Poisson solver algorithm or the like, for example.

In some embodiments according to this aspect, the method comprises one or more of: applying a 1-dimensional spatial filter along the boundary prior to in-painting the hues, identifying pixels belonging to the boundary of the saturated region by performing morphological dilation followed by subtraction, and identifying the saturated region by comparing pixel values of pixels within the saturated region to a threshold (which is not necessarily equal to the maximum possible pixel value, and which may be determined based on image statistics, for example).

In some embodiments according to this aspect, generating reconstructed pixel values comprises, for the plurality of pixels, estimating gradients for saturated pixel values based upon gradients for non-saturated pixel values (e.g., gradients of pixel values of pixels in the saturation regions for one or more color channels that are not saturated). In some embodiments according to this aspect, estimating the gradients for saturated pixels values is based in part on the estimated hues. For instance, estimating the gradient for a pixel for a saturated color channel may comprise multiplying a gradient for the pixel for an non-saturated color channel by a value based on the estimated hue of the pixel. In some embodiments according to this aspect, where gradients are known for a plurality of color channels for one or more of the plurality of pixels, estimating the gradient for the saturated pixel values for such one or more pixels is based upon the known gradients for the plurality of color channels. For example, estimating the gradient for a saturated pixel value may comprise taking a weighted combination of gradients estimated from the known gradients for a plurality of color channels.

Another aspect provides a method for reconstructing pixel values in saturated regions within a digital image, the method comprising performing a first step for obtaining estimated hues of the pixels within the saturated region based upon hues of pixels outside of the saturated region and performing a second step for estimating luminance of the pixels within the saturated region, wherein the second step bases estimated luminance for the pixels within the saturated region at least in part on the estimated hues obtained by the first step.

Another aspect provides image processing apparatus capable of processing images which include pixels or regions in which one or more color channels are saturated to provide modified images with improved appearance. In some embodiments according to this aspect, the apparatus comprises a hue estimator configured to obtain estimated hues for a plurality of the pixels in a saturated region within the image, and a pixel value reconstructor configured to generate reconstructed pixel values for replacing saturated pixel values for the plurality of pixels in the saturated region based at least in part on the estimated hues. An estimated hue for a pixel may comprise a hue that is different from a hue indicated by the pixel values of the pixel. The hue estimator may configured to obtain estimated hues by in-painting hues from a boundary of the saturated region, for example. In some embodiments, the hue estimator is configured to in-paint the estimated hues by, for each of a plurality of color channels, finding values $\phi(p)$ that optimally satisfy:

$$\nabla^2 \phi = 0 \text{ over } \Omega \text{ with } \phi|_{\partial\Omega} = f|_{\partial\Omega}$$

where $\partial\Omega$ symbolizes the boundary of the saturated region, $\Omega$ is the set of pixels within the saturated region and $\phi$ represents pixel values for one of the color channels. The hue estimator may be configured to find values of $\phi(p)$ by applying a fast Poisson solver algorithm or the like, for example.

In some embodiments according to this aspect, the hue estimator is configured to apply a 1-dimensional spatial filter along the boundary prior to in-painting the hues and/or to identify pixels belonging to the boundary of the saturated region by performing morphological dilation followed by subtraction. In some embodiments, the apparatus comprises a saturation detector configured to identify the saturated region by comparing pixel values of pixels within the saturated region to a threshold (which is not necessarily equal to the maximum possible pixel value, and which the saturation detector may be configured to determine based on image statistics, for example).

In some embodiments according to this aspect, the apparatus comprises gradient estimator configured to estimate gradients for saturated pixel values based upon gradients for non-saturated pixel values (e.g., gradients of pixel values of pixels in the saturation regions for one or more color channels are not saturated) and a pixel value reconstructor configured to generate reconstructed pixel values to replace saturated pixel values for the plurality of pixels in the saturated region based at least in part on the gradients for saturated pixel values estimated by the gradient estimator. In some embodiments according to this aspect, the gradient estimator is configured to estimate the gradients for saturated pixels values based in part on the estimated hues obtained by the hue estimator. For instance, the gradient estimator may be configured to estimate the gradient for a pixel for a saturated color channel by multiplying a gradient for the pixel for a non-saturated color channel by a value based on the estimated hue of the pixel. In some embodiments according to this aspect, the gradient estimator is configured to estimate the gradient for the saturated pixel values based upon known gradients for a plurality of color channels. For example, the gradient estimator may be configured to estimate the gradient for the saturated pixel values by determining a weighted combination of gradients estimated from the known gradients for the plurality of color channels.

Methods and apparatus as described herein may be incorporated in a wide variety of hardware including: cameras, displays (including, for example, televisions, digital cinema displays, special purpose displays such as advertising displays, virtual reality displays, vehicle simulator displays and the like), computers, graphics cards, stand-alone image processing apparatus, media players, set-top boxes, printers, and image editing suites. Methods as described herein may be performed by processors operating under software (including firmware) control. For example, such methods may be implemented in photo-editing software, image archiving software, photo-album software, media player software, software executing in an image processing stage of a device or the like. Processors may include microprocessors, digital signal processors, graphics processors, microcontrollers and other data processors. The methods may also be performed in whole or part by configurable hardware (e.g. field-programmable gate arrays (FPGAs)) or dedicated logic circuits which may incorporate application-specific integrated circuits (ASICS). Apparatus and components thereof described herein may comprise one or more programmed data processors and/or one or more software process executing on one or more data processors.

Another aspect of the invention provides a non-transitory medium carrying a set of computer-readable signals comprising instructions which, when executed by a data processor, cause the data processor to execute steps to process an image which includes pixels or one or more regions in which one or more color channels are saturated to provide a modified image with improved appearance. In some embodiments, the steps include obtaining estimated hues for a plurality of the pixels in a saturated region within an image and, based at least in part on the estimated hues, generating reconstructed pixel values to replace saturated pixel values for the plurality of pixels in the saturated region. In some embodiments according to this aspect, obtaining estimated hues comprises in-painting hues from a boundary of the saturated region. In some embodiments according to this aspect, in-painting the hues comprises, for each of a plurality of color channels, finding values $\phi(p)$ that optimally satisfy:

$$\nabla^2 \phi = 0 \text{ over } \Omega \text{ with } \phi|_{\partial\Omega} = f|_{\partial\Omega}$$

where $\partial\Omega$ symbolizes the boundary of the saturated region, $\Omega$ is the set of pixels within the saturated region and $\phi$ represents pixel values for one of the color channels.

Further aspects of the invention and features of specific embodiments of the invention are described below.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

If the luminance distribution of a scene is expressed as a function L, then the gamma-corrected captured image f can be expressed as:

$$f=\min(1, aL+n) \qquad (1)$$

where a is a constant factor that depends on the settings of the camera and n is noise. The min(·) function denotes clipping due to sensor saturation. Some embodiments seek to reconstruct from image data the unclipped image f* where f*=aL+n.

Figure 1:
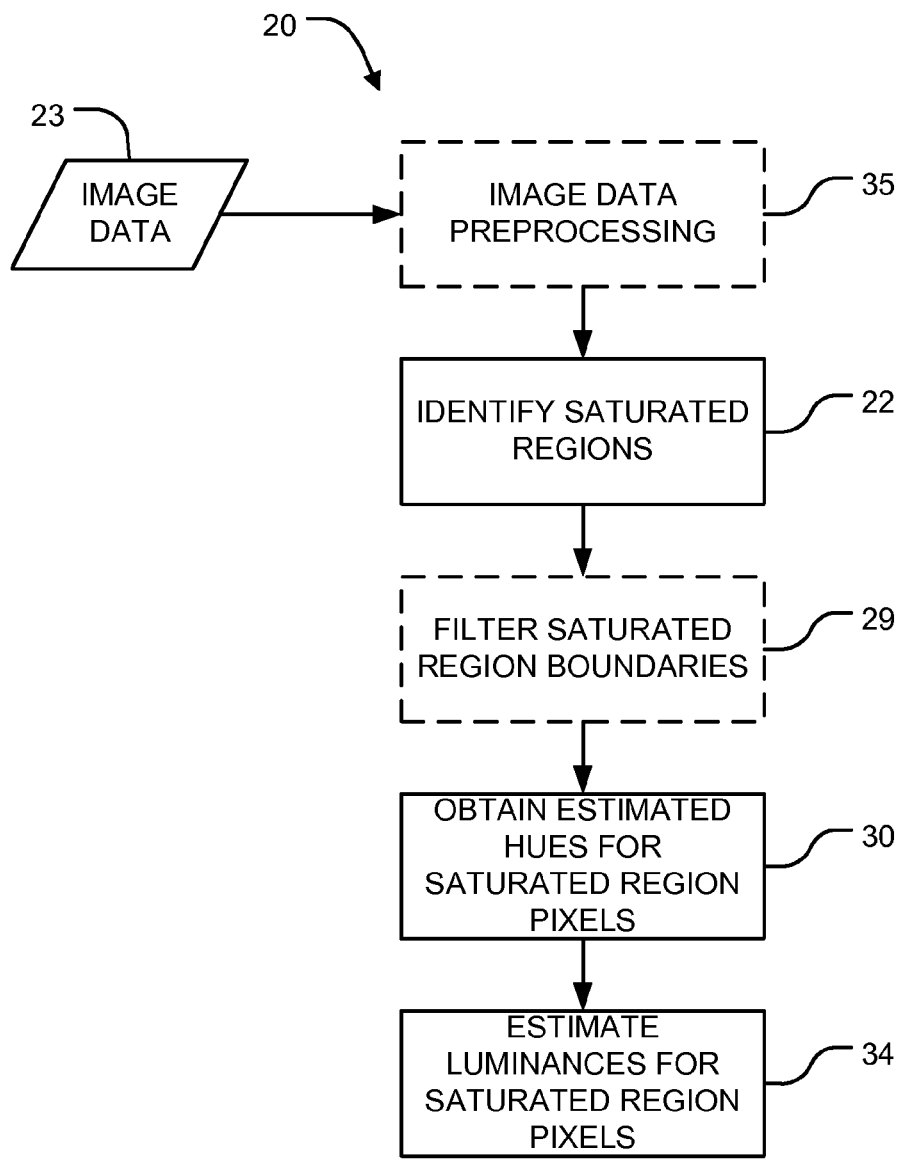
FIG. 1 is a flow chart illustrating a method according to an example embodiment.

FIG. 1 is a flow chart that illustrates a method 20 according to an example embodiment. Method 20 identifies saturated regions within an image and performs a two-stage process for compensating for saturation. In a first stage, hues for saturated pixels are estimated. In a second stage, luminances for saturated pixels are estimated.

Block 22 processes image data 23 to identify any saturated regions within the image data. In the case where image data is in an RGB or similar format then block 22 may comprise comparing pixel values to a threshold and identifying as belonging to a saturated region any pixels for which any pixel value exceeds a threshold. The threshold is not necessarily equal to the maximum possible pixel value. For example, in the case where pixel values are in the range 0 to 255 some embodiments of block 22 may set the threshold to 255 or, in the alternative, 254 or 253 or some other value that is slightly lower than 255. It is not necessary that pixel values be represented as integers. For example, pixel values may be represented as numbers in a continuous range (for example 0 to 1 is a convenient range). In an example embodiment, pixel values equal to or greater than 0.995 (in the range of 0 to 1) were identified as saturated.

The threshold used to identify saturated pixels is not necessarily fixed. In some embodiments the threshold is set based on image statistics. For example, pixels having pixel values exceeding some percentile may be identified as saturated. In an example case, a threshold is defined as the minimum of a fixed threshold value and a value derived from image statistics, For example, the threshold may be defined as being min(T1, max(T2,PX)), where T1 and T2 are thresholds with T1>T2 and PX is a percentile value such as the $90^{th}$ percentile or the $95^{th}$ percentile across all channels or the like. For example, with pixel values in the range of 0 to 1, saturated pixels may be defined as pixels having values equal to or greater than min(0.995, max(0.6, p90)) where p90 indicates the value of the $90^{th}$ percentile.

In some embodiments, image data 23 may be in a format for which pixel values do not directly represent the intensity of light in color channels. Some examples of color formats (these are non-limiting) are HSV, HLS, YCbCr, Yuv, Yu'v', LUV, XYZ, YCoCg, CIE Lab, HSI, YIQ, LCH and so on. In such embodiments, block 22 may convert image data 23 to represent colors in a RGB color model or the like. Conversion may, for example comprise computing functions of the pixel values of image data 23. In some cases the conversion may be performed by way of a matrix multiply operation. In some embodiments, image data 23 is converted to represent the intensity of light in the same color space as the color space in which the image data was originally created (e.g., the color space of the sensor used to acquire the image data) or an approximation thereof. Where image data 23 is converted to represent the intensity of light in an approximation of the color space in which the image data was originally created, a lower saturation threshold may be used.

Conversion may also be performed into an image data format that permits an increased dynamic range. Such conversion may be performed before or after identifying saturated regions. For example, image data 23 may be converted into an image data format that provides more bits to represent pixel values in each channel. For example, image data 23 may be in or may be converted into a format that provides pixel values for each color channel to be represented by 10, or 12 bits. The conversion may comprise compression or may otherwise be configured such that converted image data can represent pixel values higher than a value corresponding to saturation of the original image data. The conversion may add head room to the image data.

Method 20 obtains an estimated hue for pixels within saturated regions. An estimated hue for a pixel may be different from the hue specified by the pixel's values. For instance, an estimated hue may portray a scene depicted by a photographic image more accurately than the hue specified by the image data, or reflect the artistic intent of the creator of the image more closely than the hue specified by the image data. The estimate may be based on the hue of pixels just outside of the boundary of the saturated region, for example. As described below, other approaches to obtaining estimates of pixel hues may be applied in addition or in the alternative.

Figure 2:
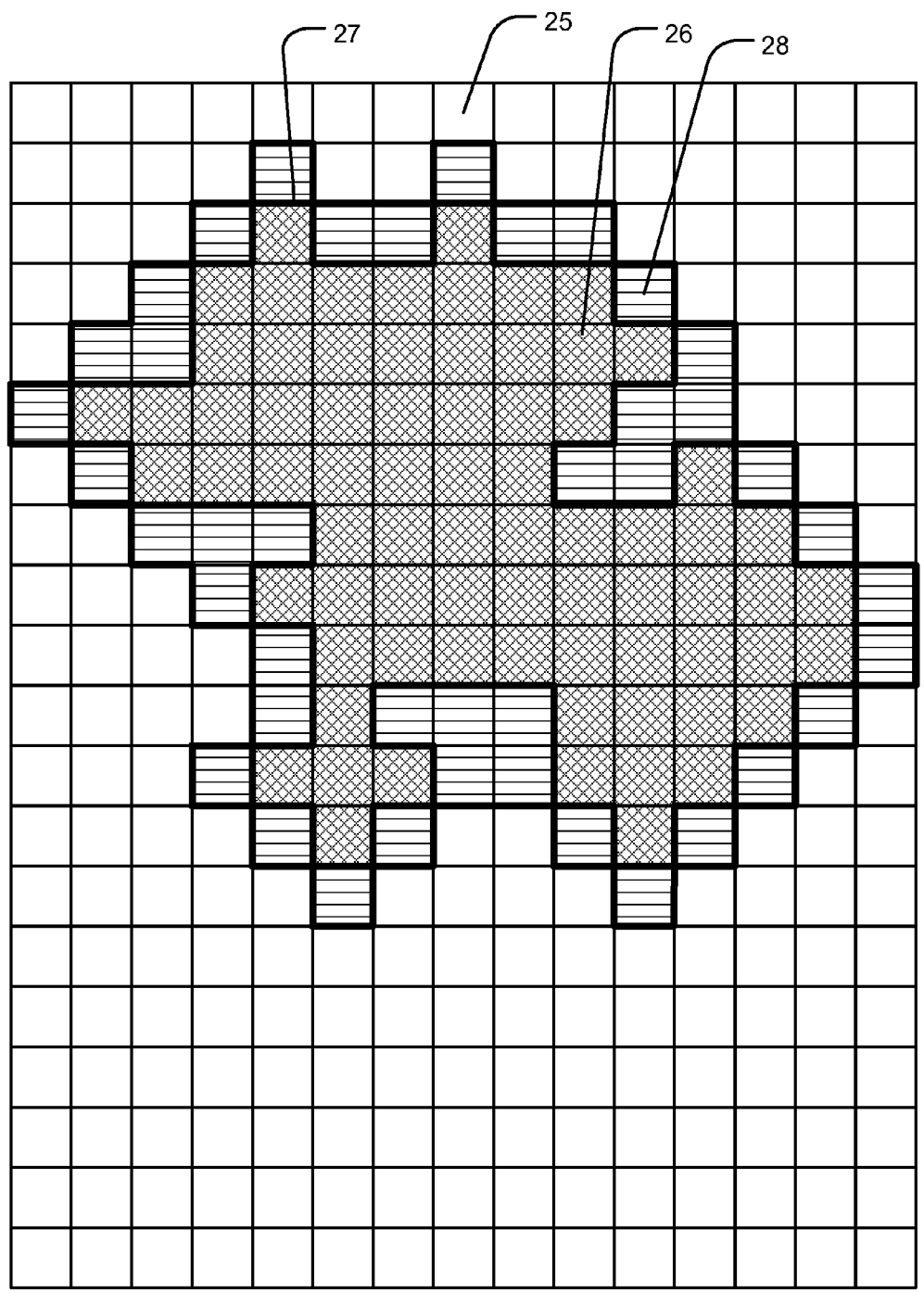
FIG. 2 is a schematic map of a portion of example image data.

FIG. 2 is a schematic map of a portion of example image data in which each square represents a pixel. Pixels 25 which are cross-hatched all have at least one color channel saturated and collectively form a saturated region 26. The boundary 27 of the saturated region is indicated two thick lines. Boundary pixels 28 (shown straight-hatched) are non-saturated pixels (i.e., pixels that have no saturated color channels) that belong to boundary 27 outside region 26. In FIG. 2, boundary 27 comprises non-saturated pixels that abut saturated region 26. In other embodiments, boundary 27 comprises non-saturated pixels that do not abut saturated region 26.

Saturated region 26 may, for example, be identified by creating a saturation mask for each channel. The saturation masks may, for example, comprise binary masks in which one value (e.g., 1) corresponds to pixels for which the channel is saturated and another value (e.g., 0) corresponds to pixels for which the channel is not saturated. These channel-specific saturation masks may be combined using a logical operation (e.g., disjunctively, such as by a logical OR operator) to yield a mask in which pixels in saturated region 26 are identified (e.g., by the value 1).

Block 30 obtains estimates for hues for pixels within saturated region 26. In some embodiments block 30 comprises determining hue estimates based at least in part on hues of boundary pixels 28. Boundary pixels 28 may be identified from by subtracting the mask that identifies pixels in saturated region 26 from a morphological dilation of that mask (e.g., using a four-connected neighbour structuring element, as in the example shown in FIG. 2, or a different structuring element), or by other edge detection techniques, for example. Block 30 may, for example, comprise in-painting hues from boundary pixels 28. In some embodiments, block 30 comprises performing an interpolation over the boundary 27 (∂Ω) of saturated region 26 (which comprises pixels belonging to the set Ω) to provide a smooth estimate of hue over saturated region 26.

In some embodiments, a filter is applied to boundary pixels 28 before block 30. FIG. 1 shows an optional filtering block 29. Filtering boundary pixels 28 may reduce noise in boundary pixels 28, which may improve estimates of hues based on boundary pixels 28. Filtering may be performed, for example, by applying a suitable 1-D filter over boundary pixels 28. The filter may comprise a function that weights boundary pixels 28 based both on proximity and similarity to a current pixel, for example. The filter may comprise, for example a 1D bilateral filter or a Gaussian filter. An experimental embodiment applies bilateral filter characterized by a spatial domain sigma of 5 and an edge-stopping (range) sigma of 0.25.

In some embodiments averaging may be performed over all boundary pixels 28 (e.g., by performing a filtering operation in which weighting takes into account similarity of values but does not take into account proximity). In some embodiments, filtering may be performed differently based on the value of the current pixel. For instance, for current pixels having small pixel values, filtering may be performed such that proximity of other boundary pixels has no or less effect on the weighting of the other boundary pixels whereas for current pixels having larger pixel values filtering may be performed such that proximity of other boundary pixels has relatively more effect on the weighting of the other boundary pixels.

In some embodiments, obtaining estimates for hues of pixels in saturated region 26 (such as by in-painting hues from boundary pixels 28) comprises applying a constrained optimization (or fitting) procedure. The constrained optimization may attempt to determine pixel values for saturated pixels 26 that best satisfy an optimization goal subject to a boundary condition. In some embodiments the optimization goal is to minimize the gradients of pixel values in each color channel within saturated region 26. Other embodiments may use different optimization goals (e.g., other optimization goals that provide smoothly varying hue estimates). The boundary condition may comprise or be based on the known values for boundary pixels 28, for example.

In some embodiments, a constrained optimization procedure applied in determining estimates for hues of pixels in saturated region 26 may comprise performing constrained optimization separately for each color channel. In some embodiments a common set of boundary pixels 28 is used for constrained optimization in all color channels. This can be advantageous. Camera glare and defocus blur tend to create a blurred outline of highlights in a scene. Bright light sources (corresponding to saturated regions) are often much brighter than the scene background. As a result, pixels in a thin outline surrounding a saturated region tend to have hues very close to the hues of pixels within the saturated region.

A wide range of constrained optimization algorithms may be applied. One example is to apply a Poisson solver algorithm. A range of fast Poisson solver algorithms are known. Another example is to apply a simulated annealing algorithm.

The number of unknowns to be determined in obtaining estimates of hue in saturated region 26 depends on the number of pixels in saturated region 26. In the embodiment illustrated in FIG. 1A the saturated region 26 includes 74 pixels. Let Let $r_{i,j}$ denote the pixel value for the red channel at the $i^{th}$ row and $j^{th}$ column of the red channel. Similarly, $g_{i,j}$ and $b_{i,j}$ respectively denote pixel values for green and blue channels. The values for all of $r_{i,j}$, $g_{i,j}$ and $b_{i,j}$ are known for all boundary pixels 28. One way to perform hue estimation is to find pixel values for pixels in saturated region 26 that come closest to satisfying a set of equations. For example, for a pixel in saturated region 26 at location (i,j) one can set up an equation for the red channel as follows:

$$4r_{i,j} - r_{i-1,j} - r_{i+1,j} - r_{i,j-1} - r_{i,j+1} = 0 \quad (2)$$

this provides a set of N equations (where N is the number of pixels in the saturated region) that can be solved in a least-squares sense, for example using a fast Poisson solver algorithm to obtain estimated values for $r_{i,j}$. The same may also be done for other color channels.

In some embodiments, estimating hue within the saturated region comprises solving Laplace's equation with the Dirichlet boundary condition given by:

$$\nabla^2 \phi = 0 \text{ over } \Omega \text{ with } \phi|_{\partial\Omega} = f|_{\partial\Omega} \quad (3)$$

where $\partial\Omega$ symbolizes the boundary of the saturated region $\Omega$. Equation (3) may be solved by integrating over $\Omega$, for example as follows:

$$\min_{\phi} \int\int_{\Omega} |\nabla\phi|^2 \text{ with } \phi|_{\partial\Omega} = f|_{\partial\Omega} \quad (4)$$

For a digital image made up of discrete pixels arranged in a rectangular (e.g., square) grid, Equations (3) and (4) may be discretized so that Equation (4) becomes:

$$\min_{\phi|\Omega} \sum_{p\in\Omega}\sum_{q\in N_p} (\phi(p) - \phi(q))^2 \text{ with } \forall\, p \in \partial\Omega\colon \phi(p) = f(p) \quad (5)$$

where $N_p$ is the 4-connected neighborhood of a pixel. In other embodiments, $N_p$ may be defined differently (e.g., for digital images made up of discrete pixels arranged in a hexagonal grid). $N_p$ may comprise larger neighbourhoods of pixels (e.g., a 3×3 block neighbouring, a 5×5 block neighbourhood, etc.). Equation (5) can be set up to determine a least-squares solution to the following system of linear equations for all p∈Ω:

$$|N_p|\phi(p) - \sum_{q\in N_p} \phi(q) = 0 \text{ with } \forall\, p \in \partial\Omega\colon \phi(p) = f(p) \quad (6)$$

In some embodiments, a gradient other than zero may be supplied in one or more dimensions for the purpose of hue estimation. In some embodiments, a user interface is configured to accept from a user input that sets one or more gradients within the saturated region. In some embodiments, gradients in the saturated region are specified by a template that is user selected (by way of a user interface) or selected automatically from among a plurality of templates. The template may, for example, be based on an example images. For example, images of sunsets have certain common characteristics. Saturated areas in an image of a sunset may be set to have gradients like those in a template derived from another sunset image. The solution to Equation (7) for which such gradients are provided as boundary conditions may have a more pleasing appearance for certain images than would be the case where the solution attempts to minimize all gradients.

Estimated hues may be obtained for pixels in saturated region 26 in other ways. For example: estimated hues may be assigned by a person. In some embodiments, an automatic algorithm first determines estimated hues of pixels within one or more saturated regions (for example as described above) and then a person optionally adjusts the estimated hues of pixels in one or more saturated regions to achieve a desired visual effect. The person may adjust the estimated hues using a suitable user interface, such as the user interface provided by image editing software or a color grading system.

Some embodiments apply in-painting algorithms in which values of pixels outside saturated region 26 are taken into account. For example, values of pixels that form image features outside of saturated region 26 may be taken into account in estimating pixel hues within saturated region 26. For instance, in the case where a linear image feature appears to extend through a saturated region, such an in-painting algorithm may determine estimated hues for pixels in the portion of the saturated region through which the linear feature passes based at least in part on hues of pixels in the linear feature outside of the saturated region (which pixels may include pixels other than boundary pixels 28). Where the image being processed is one of a set of images (for example a frame in a sequence of video frames) some embodiments apply in-painting algorithms which estimate hues of pixels in a saturated region based in part on pixel values in corresponding parts of other related images (e.g. other frames).

Block 34 determines luminance of pixels in the saturated region based at least in part on estimated hues obtained in step 30. In some embodiments, block 34 uses gradient information from non-saturated color channels to estimate gradients in saturated color channels. Where gradient information is known or estimated for all color channels, a Poisson integration over the saturated region can then be used to restore luminance values.

For example, for one or more color channels, one may be able to identify non-saturated pixels within the saturated region 26 (e.g., by using channel-specific saturation masks, such as those which may be determined in step 22). This will commonly be the case since different color channels typically become saturated at different locations within the saturated region. Gradients for pixels of such non-saturated color channels may then be determined. Determining gradients for pixels of non-saturated color channels may be performed as follows, for example, for a pixel at location i, j the x- and y-gradients ∇x and ∇y may be given respectively by:

$$\nabla_x(i,j) = r_{i,j} - r_{i-1,j} \quad (7)$$

and $$\nabla_y(i,j) = r_{i,j} - r_{i,j-1} \quad (8)$$

Equations (7) and (8) may be applied to determine gradients for those color channels and pixels within saturated region 26 for which sufficient non-saturated pixel values are known.

For those pixels i, j for which sufficient non-saturated pixel values are not known to compute one or both gradients for a color channel, such gradients may be estimated from known gradients of one or more other color channels. For example, in a pixel where red and green channels are saturated but the blue channel is not saturated and gradients for the blue channel are known, gradients for the red and green channels may be estimated from the known gradients for the blue channel. The gradient estimation may be based at least in part on one or more known gradients and the estimated hue of the pixel obtained in block 30. In some embodiments, a gradient for a pixel for a saturated color is determined based at least in part on the known gradient for the pixel for a non-saturated color channel and a value based on the estimated hue (e.g., a ratio of color-channel pixel values specified by the estimated hue). For example, suppose the estimated hue is given by the ratio: $\phi_r:\phi_g:\phi_b$ and c is a subscript identifying a color channel for which the gradients are known at a pixel. One way to estimate the gradient at the pixel for another color channel (e.g. r) is by:

$$g_r^* = \frac{\phi_r}{\phi_c} g_c \quad (9)$$

In some cases, gradients for a pixel will be known for two color channels but not for a third color channel. In such cases there are a range of possibilities for estimating gradients for the third color channel. These possibilities include estimating gradients based on gradients for one or the other of the color channels for which the gradients are known or estimating gradients based on the gradients for both of the color channels for which the gradients are known.

In the case where gradients for one color channel are estimated based on gradients for a plurality of other color channels, a weighted combination of the known gradients may be used to estimate the unknown gradients. In some embodiments the weights are variable. Weights may be selected, for example, to weight known gradients corresponding to color channels for which the known gradients are more reliable more heavily than known gradients for other color channels. For example, a gradient estimate may be computed as follows:

$$g_r^*(p) = \frac{\sum_{c \neq r} w_c(p) \frac{\phi_r}{\phi_c} g_c(p)}{\sum_{c \neq r} w_c(p)} \quad (10)$$

In some embodiments as exemplified by Equation (10) the weights $w_c$ can vary from pixel to pixel. Advantageously, the weights may be based on pixel values in the color channels being used to estimate the unknown gradients. Depending on the hue, non-saturated channels in pixels having some saturated pixels may have values close to zero or a saturation threshold. Such values tend to be affected significantly by noise. The weights may be chosen according to a weight function that weighs gradients in color channels for which pixel values are close to zero or a saturation threshold less heavily. Gradients for color channels in which pixel values are in an intermediate range may be weighted more heavily.

The weighting function preferably has a smooth profile. The weighting function preferably has slopes close to zero in its portions corresponding to pixel values of zero and pixel values approaching saturation. This may help to avoid noticeable banding at boundaries between single-channel saturated pixels and multiple-channel saturated pixels. Since, in the discrete case, gradients involve pixel values for at least two pixels, the weighting may be based on one of the pixel values or the other or on a combination of them. In an example case where a gradient is computed for pixel values at pixels p and q, the weight for the gradient is based on min(w(p), w(q)).

Figure 3:
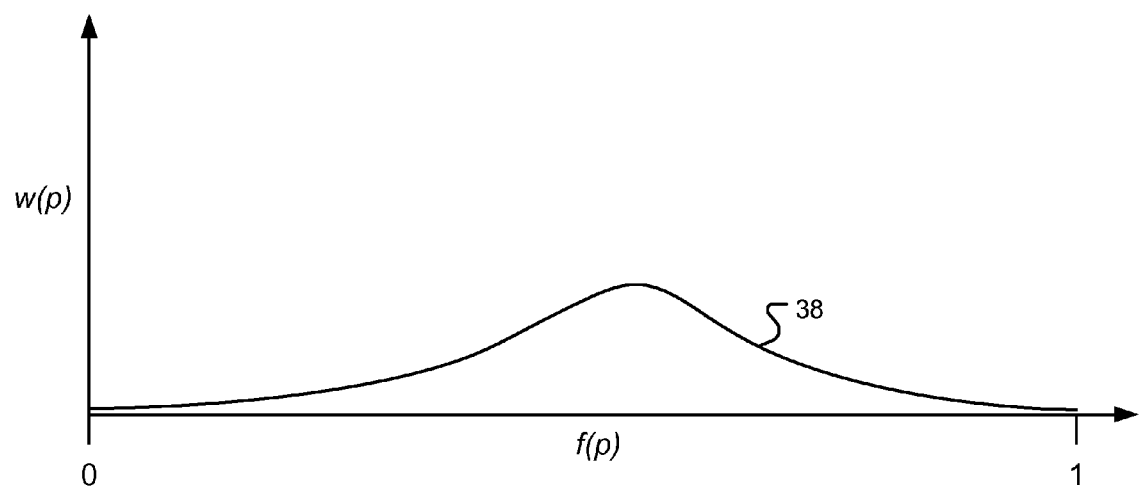
FIG. 3 is graph of an example weighting function.

In an example embodiment, the weighting function is a skewed bell curve. For example, the weighting function may be given by:

$$w(p) = \begin{cases} 3\left(\frac{f(p)}{m}\right)^3 - 2\left(\frac{f(p)}{m}\right)^2 + \varepsilon, & \text{if } f(p) \leq m \\ 3\left(\frac{1-f(p)}{1-m}\right)^3 - 2\left(\frac{1-f(p)}{1-m}\right)^2 + \varepsilon, & \text{otherwise} \end{cases} \quad (11)$$

where m is a parameter indicating a position of a peak of the weighting curve with m∈[0,1] and ε is a small value used to avoid zero weighting. In an example embodiment, m=0.65 and $\epsilon=10^{-3}$. In some embodiments the weighting curve has a peak in the range of 0.3 to 0.8 on a scale in which a value of 1 represents saturation. FIG. 3 is plot of a non-limiting example weighting curve 38.

Image data (e.g., luminance and/or pixel values) within the saturated region may then be reconstructed using estimated gradients and/or known gradients. In some embodiments, only pixel values for saturated color channels are reconstructed (i.e., non-saturated pixel values of pixels in the saturated region are not reconstructed). In other embodiments, pixel values for saturated and non-saturated color channels in the saturated region are reconstructed.

In some embodiments, reconstructing pixel values of a saturated color channel comprises applying a constrained optimization procedure whose optimization goal is to best match the gradients for those pixel values to estimated gradients for those pixel values (e.g., estimated gradients determined based, at least in part, on estimated hues). In such embodiments, the boundary condition may comprise or be based on the known pixel values for that color channel of boundary pixels to a sub-region consisting of pixels saturated in that channel (e.g., a region identified by a saturation mask specific to that color channel). Where pixel values for different saturated color channels are reconstructed separately using such an optimization procedure, different boundary conditions may be applied in the different color channels.

For example, reconstructing pixel values for a saturated channel may comprise finding a solution f* for:

$$\nabla^2 f^* = \nabla \cdot g^* \tag{12}$$

over a color channel-specific sub-region $\Omega'$ of saturated region $\Omega$ with the constraint that $f^*|_{\partial\Omega'}=f|_{\partial\Omega'}$, where $\partial\Omega'$ is the boundary of the color channel-specific sub-region $\Omega'$ of saturated region $\Omega$. A solution for Equation (12) may be found by integrating over the color channel-specific saturated sub-region $\Omega'$:

$$\min_{f^*} \int\int_{\Omega'} |\nabla f^* - g^*|^2 \tag{13}$$

subject to the constraints $f^*|_{\partial\Omega'}=f|_{\partial\Omega'}$ and $f^*|_{\Omega'}\geq f|_{\Omega'}$. The second constraint forces the reconstructed values (or luminance) to be at least equal to the saturation threshold.

Equation (13) may be discretized as:

$$\min_{f^*|\Omega'} \sum_{p\in\Omega'} \sum_{q\in N_p} (f^*(p) - f^*(q) - g^*(\langle p,q\rangle))^2 \tag{14}$$

subject to the constraint that $\forall p\in\partial\Omega':f^*(p)=f(p)$. This, in turn can be set up as a least squares solution to a system of linear equations such as the set of equations of the form:

$$|N_p|f^*(p) - \sum_{q\in N_p} f^*(q) = g^*(\langle p,q\rangle) \tag{15}$$

subject to the same constraints as for Equation (13). In applying the boundary conditions of Equations (12)-(15), boundary values may be original image data pixel values or be filtered values (such as result from filtering like that performed in step 29, for example).

In an example embodiment, an equation is generated for each pixel within the saturated sub-region. The equations may, for example, be like the following:

$$4r_{i,j}-r_{i-1,j}-r_{i,j-1}-r_{i+1,j}-r_{i,j+1}=\nabla_x r_{i,j}+\nabla_y r_{i,j}-\nabla_x r_{i,j+1}-\nabla_y r_{i+1,j} \tag{16}$$

This yields an overdetermined system of equations that may be solved approximately, such as in a least squares sense. A separate system of equations may be set up and solved for each saturated color channel to yield reconstructed pixel values (or luminance) for the pixels within saturated region 26.

In some embodiments, reconstructing pixels values in a saturated region comprises reconstructing all pixel values in the saturation region, regardless of whether the pixel values are saturated or not. For example, all pixel values for a particular color channel in a saturated region may be reconstructed by applying a constrained optimization whose optimization goal is to best match the gradients for those pixel values whose gradients are known (e.g., values of pixels not saturated in the particular color channel) to the known gradients and to best match the gradients for those pixel values whose gradients are not known (e.g., values of pixels saturated in the particular color channel) to estimated gradients (e.g., estimated gradients determined based, at least in part, on estimated hues). The boundary condition may comprise or be based on the known values for boundary pixels of the saturation region.

In some embodiments, gradients in areas in which all color channels are saturated are adjusted prior to reconstruction to provide additional boost to luminance in saturated regions, such as by using high dynamic range extension techniques, for example.

Methods as described herein may be applied in combination with steps for boosting the dynamic range of digital images.

In an alternative embodiment, block 34 may maintain pixel values for any non-saturated channels. For example, pixel values (or luminance) for a saturated channel may be determined based on pixel values of one or more non-saturated channels and a value based on the estimated hue obtained in step 30. In some embodiments, a pixel value for a saturated channel of a pixel is determined by multiplying a pixel value of a non-saturated channel of the pixel by a ratio of the saturated channel to the non-saturated channel corresponding to the pixel's estimated hue. For example, consider the case of a pixel in a saturated region having pixel values R:G:B=90:10:255 (or the equivalent in a higher-dynamic range representation, for example 0.3529:0.0392:1.0000). Suppose that the estimated hue obtained for the pixel in block 30 corresponds to a ratio R:G:B of 9:1:36. The pixel values for the pixel may be set to 90:10:360 (or the equivalent in a higher-dynamic range representation, for example 0.3529:0.0392:1.4112).

In cases where a pixel has a plurality of non-saturated channels, there are a range of possibilities for determining a pixel value for a saturated channel of the pixel. These possibilities include determining the pixel value for the saturated channel of the pixel based on pixels values of one or the other of the non-saturated color channels or determining the pixel value for the saturated channel of the pixel based on pixel value of both of the non-saturated color channels. For example, a pixel value for a saturated channel of the pixel may be determined by combining the values determined by multiplying a pixel value of each of the non-saturated channels of the pixel by the corresponding ratio of the saturated channel to the non-saturated channel corresponding to the pixel's estimated hue.

The nature of the input image data can affect the quality of results obtained with the methods described above. In cases where the image data was obtained from a sensing array using a filter mosaic such as a Bayer filter mosaic, a demosaicing algorithm is usually applied to raw image data to derive a pixel value for each color channel for each pixel. Some demosaicing algorithms introduce crosstalk between color channels. This can reduce the quality of reconstructed images produced by the methods above by distorting the input image data and making the assumption of independence between color channel values less reliable. In some cases, better results can be obtained by applying a demosaicing algorithm that obtains unknown pixel values by interpolation within one color channel.

Depending upon the input image it may be necessary or desirable to perform one or more pre-processing steps on the input image data (or portions thereof) prior to implementing the methods as described above. Preprocessing is indicated generally by block 35 in FIG. 1.

One preprocessing step may be Gamma correction such that pixel values are represented in a linear domain (e.g. a domain in which each pixel value is directly related to light intensity in a corresponding color channel). In the case where input image data is not in the linear domain a preprocessing step may be applied to convert the image data into the linear domain. For example, where the input image data has been gamma encoded, preprocessing may include applying the inverse of the gamma encoding operation. If desired, after completion of processing a suitable image correction function (such as an arbitrary gamma function) may be applied to prepare the processed image data for display on a target display system.

Another preprocessing operation that may be beneficial is to set pixel values that are close-to-zero to be zero. This can advantageously avoid boosting noise. For example, where pixel values are represented in the range of 0 to 1 (with 1 corresponding to saturation), pixel values below a small threshold (for example 0.001) may be set to be zero. Preprocessing may comprise other de-noising operations.

In some cases, a saturated region occurs at the boundary of an image such that some image boundary pixels are saturated in all color channels. In such cases a portion the saturated region may not be enclosed by a boundary for which pixel values are known. This may be handled in various ways including treating image boundary pixels saturated in all color channels as boundary pixels of the saturated region to provide an enclosed boundary for the saturated region. Another way of handling image boundary pixels that are saturated in all color channels is to expand the image by outwardly replicating the image boundary pixels (e.g., so that a 100×100 pixel image becomes a 102×102 pixel image), treating the new pixels, which lie on the boundary of the expanded image, as boundary pixels of the saturated region, and deleting the added pixels after estimating hues (e.g., either before or after gradient estimation and/or pixel value reconstruction).

Figure 4:
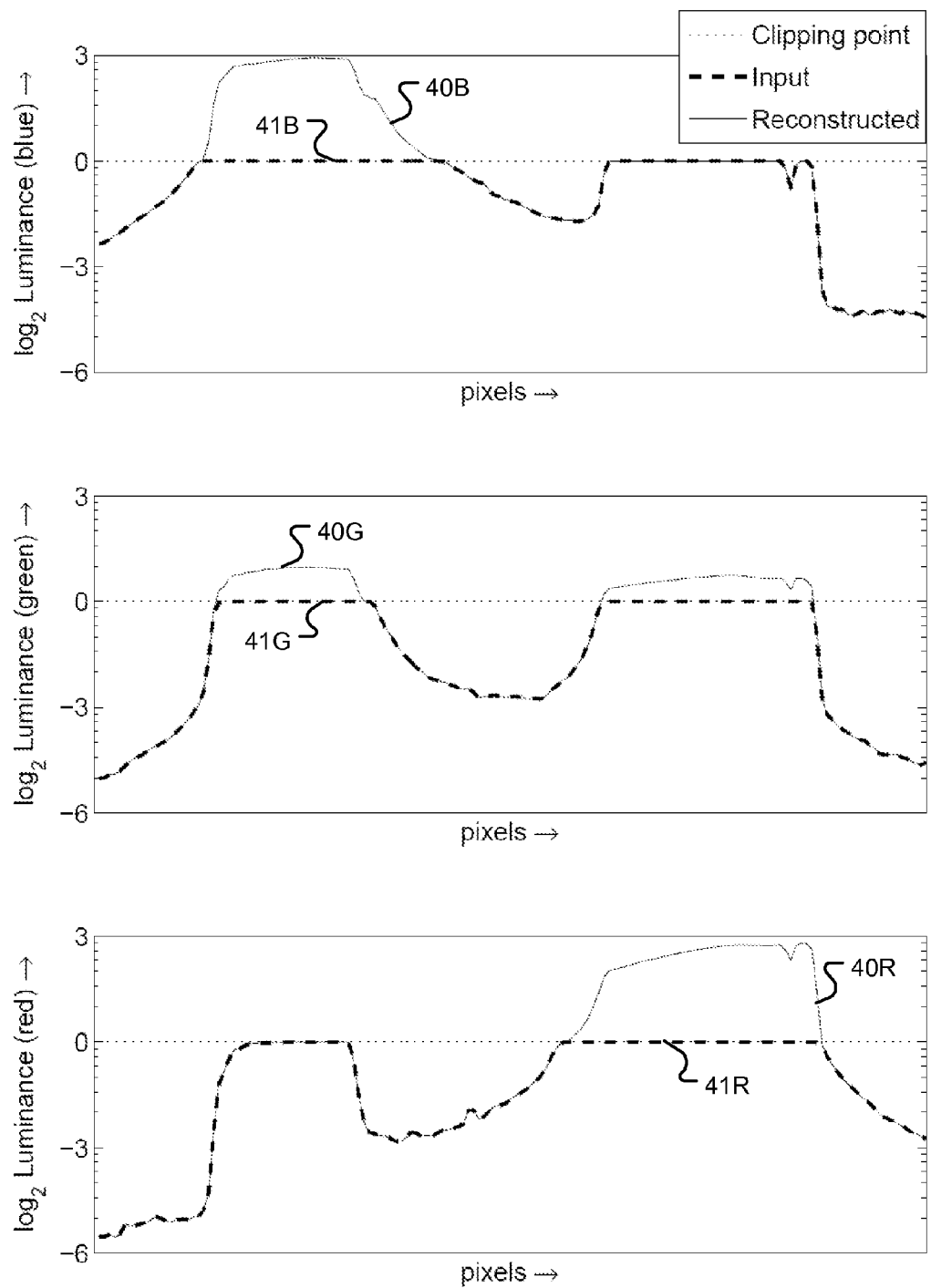
FIG. 4 is a graph of example original and reconstructed pixel values.

FIG. 4 shows an example of reconstructed pixel values along a line in an image that extends through some saturated regions. The lines 40R, 40G and 40B represent reconstructed pixel values for red green and blue color channels respectively. The lines 41R, 41G and 41B represent pixel values for the red green and blue color channels respectively in original image data.

Figure 5:
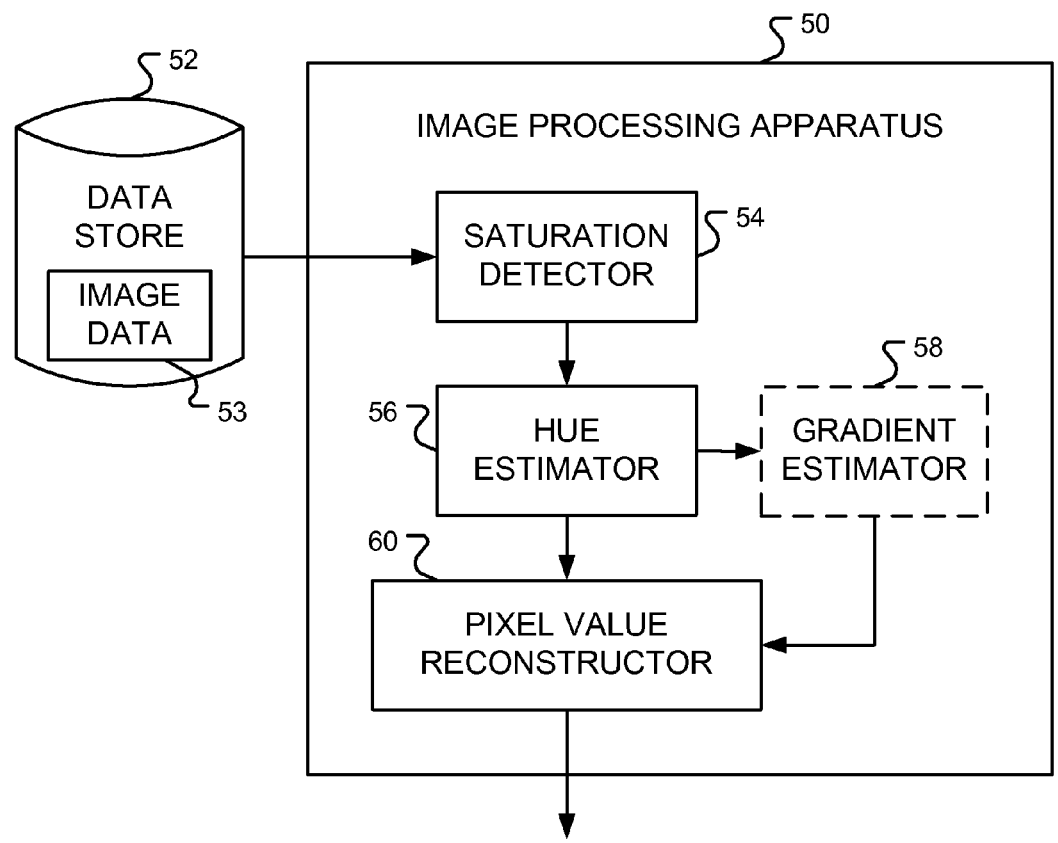
FIG. 5 is a schematic depicting an image processing apparatus according to an example embodiment.

FIG. 5 illustrates image processing apparatus 50 according to an example embodiment. Apparatus 50 comprises or has access to a data store 52 holding input image data 53. A saturation detector 54 is configured to identify saturated pixels and saturated regions defined by groups of saturated pixels. Saturation detector 54 may, for example, be configured to identified saturated regions by creating a saturation mask for each channel (e.g., according to a criterion of whether pixel values for the channel exceed a threshold). Saturation detector 54 may be configured to combine such channel-specific saturation masks using a logical operation (e.g., disjunctively, such as by a logical OR operator) to yield a mask that identifies pixels of saturated regions (e.g., by the value 1).

A hue estimator 56 is configured to obtain estimated hues of pixels in saturated regions identified by saturation detector 54. In some embodiments hue estimator 56 is configured to determine hue estimates based at least in part on hues of boundary pixels of saturated regions identified by saturation detector 54. Hue estimator 56 may be configured to identify such boundary pixels by subtracting the mask that identifies pixels of saturated regions from a morphological dilation of that mask, or by other edge detection techniques, for example.

In some embodiments, hue estimator 56 is configured to apply a 1-dimensional spatial filter along the boundary pixels prior to in-painting the hues. Example of 1-dimensional filters that hue estimator may be configured to apply include a bilateral filter, a Gaussian filter. Hue estimator 56 may be configured to performing filtering operations that, for a current pixel, take into account one or both of similarity of values and proximity to the current pixel.

Hue estimator 56 may configured to obtain estimated hues for a saturated region by in-painting hues from a boundary of the saturated region, for example. For example, hue estimator 56 may be configured to in-paint hues from a boundary of the saturation region by applying an optimization or fitting procedure that attempts to determine values for saturated pixels that best satisfy a boundary condition comprising and/or based on known values for boundary pixels. Hue estimator 56 may be configured to apply a range of suitable optimizing algorithms, such as a Poisson solver algorithm, a simulated annealing algorithm or the like.

In some embodiments, hue estimator 56 is configured to in-paint the estimated hues by, for each of a plurality of color channels, finding values $\phi(p)$ that optimally satisfy Equation (3). Hue estimator 56 may be configured to solve Equation (3) by integrating over $\Omega$ and finding $\phi$ which minimize the result. For example, hue estimator 56 may be configured to operate on a digital image made up of discrete pixels arranged in a rectangular (e.g., square) grid, and be configured to discretize the task of minimizing the integral of Equation (3) over $\Omega$ as equation (5). Hue estimator 56 may be configured to optimize Equation (5) by determining a least-squares solution to the a system of linear equations according to Equation (6) for all $p \in \Omega$. Hue estimator 56 may be configured to find values of $\phi(p)$ by applying a fast Poisson solver algorithm or the like, for example.

Apparatus 50 comprises an optional gradient estimator 58 configured to determine estimates of color channel gradients of pixels for which sufficient non-saturated pixel values are not known to compute one or both gradients for a color channel. Gradient estimator 58 may be configured estimate gradients based at least in part on one or more known gradients and the estimated hue of the pixel obtained by hue estimator 56. For example, gradient estimator 58 may be configured to determine an estimate of a gradient for a pixel for a saturated color channel based at least in part on a known gradient for the pixel for a non-saturated color channel and a value based on the estimated hue (e.g., a ratio of color-channel pixel values specified by the estimated hue). For instance, gradient estimator 58 may be configured to determine an estimate of the gradient at the pixel for another color channel (e.g. r) according to Equation (9), above.

In cases where gradients for a pixel are known for two color channels but not for a third color channel, gradient estimator 58 may be configured to determine estimates for gradients for the third color channel in any of number of different ways. For example, gradient estimator 58 may be configured to determine estimated gradients based on gradients for one or the other of the color channels for which the gradients are known or based on the gradients for both of the color channels for which the gradients are known.

In the case where gradients for one color channel are estimated based on gradients for a plurality of other color channels, gradient estimator 58 may be configured to determine an estimate of the unknown gradients based on a weighted combination of the known gradients. In some embodiments, the weights applied by gradient estimator 58 are variable. Gradient estimator 58 may be configured to select weights to weight known gradients corresponding to color channels for which the known gradients are more reliable more heavily than known gradients for other color channels, for example. For example, gradient estimator 58 may be configured to compute a gradient estimate according to Equation (10). In some embodiments, gradient estimator 58 is configured to compute a gradient estimate according to Equation (10) using a weighting function that has a smooth profile with slopes close to zero in its portions corresponding to pixel values of zero and pixel values approaching saturation (such as a weighting function given by Equation (11), for example).

Apparatus 50 comprises a pixel value reconstructor 60 configured to reconstruct pixel values in the saturated regions based at least in part on the estimated hues obtained by hue estimator 56. In some embodiments, pixel value reconstructor 60 is configured to reconstruct pixel values in the saturated regions based on the values of non-saturated channels and a ratio specified by the estimated hues obtained by hue estimator 56.

In some embodiments, pixel value reconstructor 60 is configured to reconstruct pixel values in the saturated regions based at least in part on color channel gradients determined by gradient estimator 58. For example, pixel value reconstructor 60 may be configured to find a solution f* to Equation (12) over the sub-region $\Omega'$ with the constraint that $f^*|_{\partial\Omega'} = f|_{\partial\Omega'}$. In some embodiments, pixel value reconstructor 60 is configured to solve Equation (12) by minimizing an integral over the sub-region $\Omega'$ (i.e., according to Equation (13)) subject to the constraints $f^*|_{\partial\Omega'} = f|_{\partial\Omega'}$ and $f^*|_\Omega \geq f|_\Omega$.

In some embodiments, pixel value reconstructor 60 is configured to operate on a digital image made up of discrete pixels arranged in a rectangular (e.g., square) grid, and configured to discretize the task of minimizing the integral of Equation (13) over $\Omega$ according to Equation (14), subject to the constraint that $$\forall p \in \partial\Omega' : f^*(p) = f(p).$$

Pixel value reconstructor 60 may be configured to solve Equation (14) as a least squares solution to a system of linear equations such as the set of equations of the form of Equation (15), subject to the same constraints as for Equation (13). Pixel value reconstructor 60 may be configured to set up and solve a separate system of equations for each color channel to yield reconstructed pixel values (or luminance) for the pixels within saturated regions.

The functional elements of apparatus 50 depicted in FIG. 5 may share components. Some of the functional elements may comprise one or more programmed data processors and/or one or more software processes that execute on one or more data processors.

Without limiting the applicability of the methods and apparatus described herein in relation to any of the applications described above, methods and apparatus as described herein may be applied in post-production color grading of movies, videos and other visual media works, software for processing digital photographs (such as software of the type supplied by digital camera vendors with digital cameras), plug-ins for image processing applications (such as, for example Adobe Photoshop™ or Apple Aperture™), in-camera software for processing images acquired by the camera, displays and the like.

Methods and apparatus as described herein may be fully automatic or involve interaction with a user. As one example where methods as described herein are performed in a post-production color grading environment, a production may be processed to recreate saturated regions of images (which may be still or video images). A user may run a system to automatically process the image(s) and evaluate the result on a reference display. The user may choose to fine tune the results in one or more areas and/or one or more images. Fine tuning may comprise one or more of: manually painting hues into a saturated area; adjusting hues in a hue map prepared automatically as described above; adjusting gradients or other boundary conditions and then allowing the system to proceed to generate hues according to the adjusted boundary conditions; selecting an in-painting algorithm or adjusting parameters of an in-painting algorithm to generate hues for one or more saturated areas; selecting a template to apply in an in-painting algorithm; and combinations of one or more of the above.

Certain implementations of the invention comprise computer processors which execute software instructions which cause the processors to perform a method of the invention. For example, one or more processors in a computer, display, camera, printer, or other image processing apparatus may implement the methods described herein by executing software instructions in a program memory accessible to the processors. The invention may also be provided in the form of a program product. The program product may comprise any medium (non-transitory or transitory) which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, saturation detector, hue estimator, gradient estimator, pixel value reconstructor, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

hue estimates may obtained, at least in part, by inferring hue from other images depicting similar objects;

hue estimates may obtained, at least in part, by determining a hue estimate for one frame in a video, and using the same estimate for corresponding pixels in other frames of the video;

constrained optimizations may be solved using mathematical techniques other than those specifically described herein;

different integrators (e.g., other than a Poisson integrator) may be used to integrate gradient fields.

Accordingly, the scope of the invention is to be construed in accordance with the substance defined by the following claims.

What is claimed is:

1. A method for processing image data comprising pixel values for pixels defining an image, the method comprising:

obtaining estimated hues for a plurality of the pixels in a saturated region within the image; and, based at least in part on the estimated hues, generating reconstructed pixel values to replace saturated pixel values for the plurality of pixels in the saturated region;

wherein obtaining estimated hues comprises in-painting hues from a boundary of the saturated region; and, applying a 1-dimensional spatial filter along the boundary prior to in-painting the hues;

wherein the 1-dimensional spatial filter weights contributions of pixels along the boundary according to proximity to a current pixel; and, wherein the 1-dimensional spatial filter weights contributions of pixels along the boundary such that for a current pixel having small pixel values, the proximity of other pixels along the boundary has less effect on the weighting of the other pixels as compared to the effect on the weighting of the other pixels for a current pixel having large pixel values.

2. A method according to claim 1 wherein the spatial filter comprises a 1-dimensional bilateral filter.

3. A method according to claim 1 wherein the image data comprises pixel values for each of a plurality of color channels and, for at least some of the plurality of pixels in the saturated region, the pixel values for one or more color channels are not saturated.

4. A method according to claim 1 comprising identifying pixels belonging to the boundary of the saturated region by performing morphological dilation followed by subtraction.

5. A method according to claim 1 wherein in-painting the hues comprises, for each of a plurality of color channels, finding values $\phi(p)$ that optimally satisfy:

$$\nabla^2\phi=0 \text{ over } \Omega \text{ with } \phi|\partial\Omega=f|\partial\Omega$$

where $\partial\Omega$ symbolizes the boundary of the saturated region, $\Omega$ is the set of pixels within the saturated region, $\phi$ represents pixel values for one of the color channels, and f represents the pixel values for the one of the color channels for pixels on the boundary of the saturated region.

6. A method according to claim 5 comprising applying a fast Poisson solver algorithm to find the values $\phi(p)$.

7. A method according to claim 1 wherein generating reconstructed pixel values comprises, for the plurality of pixels, estimating gradients for saturated pixel values based upon gradients for non-saturated pixel values.

8. A method according to claim 7 wherein estimating the gradients for saturated pixels values is based in part on the estimated hues.

9. A method according to claim 8 wherein estimating the gradient for a pixel for a saturated color channel comprises multiplying a gradient for the pixel for a non-saturated color channel by a value based on the estimated hue of the pixel wherein the value comprises a ratio of color channel pixel values specified by the estimated hue.

10. A method according to claim 8 wherein, for one or more of the plurality of pixels, gradients are known for a plurality of color channels and, for such one or more pixels, estimating the gradient for the saturated pixel values is based upon the known gradients for the plurality of color channels.

11. A method for processing image data comprising pixel values for pixels defining an image, the method comprising:

obtaining estimated hues for a plurality of the pixels in a saturated region within the image; and, based at least in part on the estimated hues, generating reconstructed pixel values to replace saturated pixel values for the plurality of pixels in the saturated region;

wherein generating reconstructed pixel values comprises, for the plurality of pixels, estimating gradients for saturated pixel values based upon gradients for non-saturated pixel values;

wherein estimating the gradients for saturated pixels values is based in part on the estimated hues;

wherein, for one or more of the plurality of pixels, gradients are known for a plurality of color channels and, for such one or more pixels, estimating the gradient for the saturated pixel values is based upon the known gradients for the plurality of color channels; and, wherein estimating the gradient for the saturated pixel values comprises taking a weighted combination of gradients estimated from the known gradients for the plurality of color channels.

12. A method according to claim 11 comprising identifying the saturated region by comparing pixel values of pixels of the image data to a threshold.

13. A method according to claim 12 comprising determining the threshold based on image statistics.

14. A method according to claim 11 comprising preprocessing the image data by setting all pixel values below a cutoff value to zero prior to estimating the hues.

15. A method according to claim 11 wherein taking a weighted combination of gradients estimated from the known gradients comprises weighting the known gradients based on pixel values for the color channels corresponding to the known gradients.

16. A method according to claim 15 wherein weighting the known gradients comprises determining weights using a weighting function that tends toward low weights at small pixel values and at pixel values approaching a saturation threshold.

17. A method according to claim 16 wherein the weighting function comprises a skewed bell curve.

18. A method according to claim 16 wherein the weighting function comprises a peak in the range of 0.3 to 0.8 on a scale in which a value of 1 represents saturation.

19. A method according to claim 11 wherein generating reconstructed pixel values comprises finding a solution f* that satisfies $$\nabla^2 f^* = = \nabla \cdot g^* \text{ over } \Omega \text{ with } f^*|\Omega = = f|\partial\Omega$$

where $\phi\Omega$ symbolizes the boundary of the saturated region, $\Omega$ is the set of pixels within the saturated region, g* is the estimated gradient of pixels in the saturated region, and f represents the pixel values for the one of the color channels for pixels on the boundary of the saturated region.

20. A method for processing image data comprising pixel values for pixels defining an image, the method comprising:
   obtaining estimated hues for a plurality of the pixels in a saturated region within the image; and,
   based at least in part on the estimated hues, generating reconstructed pixel values to replace saturated pixel values for the plurality of pixels in the saturated region;
   wherein the image data comprises pixel values for each of a plurality of color channels and, for at least some of the plurality of pixels in the saturated region, the pixel values for one or more color channels are not saturated, and wherein generating reconstructed pixel values comprises, for the at least some of the plurality of pixels in the saturated region, multiplying values based on the pixel values for one or more non-saturated color channels by values based on the estimated hues; and,
   wherein the values based on the estimated hues comprise ratios of saturated channels to non-saturated channels corresponding to the estimated hues.

21. A method according to claim 20 wherein obtaining estimated hues for a plurality of the pixels in a saturated region within the image comprises obtaining a hue assigned by a person.

22. Apparatus for processing image data comprising pixel value for pixels defining an image, the apparatus comprising:
   a hue estimator configured to obtain estimated hues for a plurality of the pixels in a saturated region within the image; and,
   a pixel value reconstructor configured to generate reconstructed pixel values based at least in part on the estimated hues for replacing saturated pixel values for the plurality of pixels in the saturated region;
   wherein the hue estimator is configured to apply a 1-dimensional spatial filter along the boundary;
   wherein the 1-dimensional spatial filter weights contributions of pixels along the boundary according to proximity to a current pixel; and,
   wherein the 1-dimensional spatial filter weights contributions of pixels along the boundary such that for a current pixel having small pixel values, the proximity of other pixels along the boundary has less effect on the weighting of the other pixels as compared to the effect on the weighting of the other pixels for a current pixel having large pixel values.

23. Apparatus according to claim 22 wherein the hue estimator is configured to obtain estimated hues by in-painting hues from a boundary of the saturated region.

24. Apparatus according to claim 23 wherein the hue estimator is configured to identify pixels belonging to the boundary of the saturated region by performing morphological dilation followed by subtraction.

25. Apparatus according to claim 22 wherein the spatial filter comprises a 1-dimensional bilateral filter.

26. Apparatus according claim 22 wherein the hue estimator is configured to in-paint the estimated hues by, for each of a plurality of color channels, finding values $\phi(p)$ that optimally satisfy:

$$\nabla^2 \phi = 0 \text{ over } \Omega \text{ with } \phi|\partial\Omega = f|\partial\Omega$$

where $\phi\Omega$ symbolizes the boundary of the saturated region, $\Omega$ is the set of pixels within the saturated region, $\phi$ represents pixel values for one of the color channels, and f represents the pixel values for the one of the color channels for pixels on the boundary of the saturated region.

27. Apparatus according to claim 26 wherein the hue estimator is configured to apply a fast Poisson solver algorithm to find the values $\phi(p)$.

28. Apparatus according to claim 22 comprising a saturation detector configured to identify the saturated region by comparing pixel values of pixels within the saturated region to a threshold.

29. Apparatus according to claim 28 wherein the saturation detector is configured to determine the threshold based on image statistics.

30. Apparatus according to claim 22 comprising an image data preprocessor configured to preprocess the image data by setting all pixel values below a cutoff value to zero before the hue estimator obtains estimated hues.

31. Apparatus according to claim 22 comprising a gradient estimator configured to estimate gradients for saturated pixel values based upon gradients for non-saturated pixel values,
   wherein the pixel value reconstructor is configured to generate reconstructed pixel values to replace saturated pixel values for the plurality of pixels in the saturated region based at least in part on the gradients for saturated pixel values estimated by the gradient estimator.

32. Apparatus according to claim 31 wherein the gradient estimator is configured to estimate the gradients for saturated pixels values based in part on the estimated hues obtained by the hue estimator.

33. Apparatus according to claim 32 wherein the gradient estimator is configured to estimate the gradient for a pixel for a saturated color channel by multiplying a gradient for the pixel for a non-saturated color channel by a value based on the estimated hue of the pixel wherein the value comprises a ratio of color channel pixel values specified by the estimated hue.

34. Apparatus according to claim 31 wherein the gradient estimator is configured to estimate the gradient for the saturated pixel values based upon known gradients for a plurality of color channels.

35. Apparatus according to claim 34 wherein the gradient estimator is configured to determine a weighted combination of gradients estimated from the known gradients by weighting the known gradients based on pixel values for the color channels corresponding to the known gradients.

36. Apparatus according to claim 35 wherein weighting the known gradients comprises determining weights using a weighting function that tends toward low weights at small pixel values and at pixel values approaching a saturation threshold.

37. Apparatus according to claim 36 wherein the weighting function comprises a skewed bell curve.

38. Apparatus according to claim 36 wherein the weighting function comprises a peak in the range of 0.3 to 0.8 on a scale in which a value of 1 represents saturation.

39. Apparatus according to claim 31 wherein the pixel reconstructor is configured to find a solution f* that satisfies $$\nabla^2 f^* = = \nabla \cdot g^* \text{ over } \Omega \text{ with } f^*|\Omega = = f|\partial\Omega$$

where $\phi\Omega$ symbolizes the boundary of the saturated region, $\Omega$ is the set of pixels within the saturated region, g* is the estimated gradient of pixels in the saturated region determined by the gradient estimator, and f represents the pixel values for the one of the color channels for pixels on the boundary of the saturated region.

40. Apparatus according to claim 22 wherein the pixel reconstructor is configured to multiply values based on the pixel values for one or more non-saturated color channels by values based on the estimated hues obtained by the hue estimator.

41. Apparatus for processing image data comprising pixel value for pixels defining an image, the apparatus comprising:
  a hue estimator configured to obtain estimated hues for a plurality of the pixels in a saturated region within the image; and,
  a pixel value reconstructor configured to generate reconstructed pixel values based at least in part on the estimated hues for replacing saturated pixel values for the plurality of pixels in the saturated region; a gradient estimator configured to estimate gradients for saturated pixel values based upon gradients for non-saturated pixel values,
  wherein the pixel value reconstructor is configured to generate reconstructed pixel values to replace saturated pixel values for the plurality of pixels in the saturated region based at least in part on the gradients for saturated pixel values estimated by the gradient estimator;
  wherein the gradient estimator is configured to estimate the gradient for the saturated pixel values based upon known gradients for a plurality of color channels; and,
  wherein the gradient estimator is configured to estimate the gradient for the saturated pixel values by determining a weighted combination of gradients estimated from the known gradients for the plurality of color channels.

42. Apparatus for processing image data comprising pixel value for pixels defining an image, the apparatus comprising:
  a hue estimator configured to obtain estimated hues for a plurality of the pixels in a saturated region within the image; and,
  a pixel value reconstructor configured to generate reconstructed pixel values based at least in part on the estimated hues for replacing saturated pixel values for the plurality of pixels in the saturated region
  wherein the pixel reconstructor is configured to multiply values based on the pixel values for one or more non-saturated color channels by values based on the estimated hues obtained by the hue estimator; and,
  wherein the values based on the estimated hues comprise ratios of saturated channels to non-saturated channels corresponding to the estimated hues.

43. Apparatus according to claim 42 wherein at least one of the hue estimator and the pixel value reconstructor comprises a programmed data processor.

44. Apparatus according to claim 42 wherein at least one of the hue estimator and the pixel value reconstructor comprises a software process executing on one or more data processors.

45. A tangible medium carrying a set of non-transitory computer-readable signals comprising instructions which, when executed by a data processor, cause the data processor to execute the steps of:
  obtaining estimated hues for a plurality of the pixels in a saturated region within an image; and,
  based at least in part on the estimated hues, generating reconstructed pixel values to replace saturated pixel values for the plurality of pixels in the saturated region;
  wherein generating the reconstructed pixel values comprises, for the plurality of pixels, estimating gradients for saturated pixel values based upon gradients for non-saturated pixel values;
  wherein estimating the gradients for saturated pixels values is based in part on the estimated hues;
  wherein, for one or more of the plurality of pixels, gradients are known for a plurality of color channels and, for such one or more pixels, estimating the gradient for the saturated pixel values is based upon the known gradients for the plurality of color channels;
  wherein estimating the gradient for the saturated pixel values comprises taking a weighted combination of gradients estimated from the known gradients for the plurality of color channels.

46. The medium of claim 45 wherein obtaining estimated hues comprises in-painting hues from a boundary of the saturated region.

47. The medium of claim 46 wherein in-painting the hues comprises, for each of a plurality of color channels, finding values $\phi(p)$ that optimally satisfy:

$$\nabla^2\phi=0 \text{ over } \Omega \text{ with } \phi|\partial\Omega=f|\partial\Omega$$

where $\phi\Omega$ symbolizes the boundary of the saturated region, $\Omega$ is the set of pixels within the saturated region, $\phi$ represents pixel values for one of the color channels, and f represents the pixel values for the one of the color channels for pixels on the boundary of the saturated region.

48. The medium of claim 45 wherein generating reconstructed pixel values comprises finding a solution f* that satisfies $$\nabla^2 f^* ==\nabla \cdot g^* \text{ over } \Omega \text{ with } f^*|\Omega==f|\partial\Omega$$

where $\phi\Omega$ symbolizes the boundary of the saturated region, $\Omega$ is the set of pixels within the saturated region, g* is the estimated gradient of pixels in the saturated region, and f represents the pixel values for the one of the color channels for pixels on the boundary of the saturated region.

49. The medium of claim 45 wherein the image data comprises pixel values for each of a plurality of color channels and, for at least some of the plurality of pixels in the saturated region, the pixel values for one or more color channels are not saturated, and wherein generating reconstructed pixel values comprises, for the at least some of the plurality of pixels in the saturated region, multiplying values based on the pixel values for one or more non-saturated color channels by values based on the estimated hues wherein the values based on the estimated hues comprise ratios of saturated channels to non-saturated channels corresponding to the estimated hues.

* * * * *

UNITED STATES PATENT AND TRADEMARK OFFICE
CERTIFICATE OF CORRECTION

| | | |
|---|---|---|
| PATENT NO. | : 8,861,851 B2 | Page 1 of 1 |
| APPLICATION NO. | : 13/463775 | |
| DATED | : October 14, 2014 | |
| INVENTOR(S) | : Wolfgang Heidrich and Mushfiqur Rouf | |

It is certified that error appears in the above-identified patent and that said Letters Patent is hereby corrected as shown below:

IN THE CLAIMS:

COLUMN 18 LINE 63
In claim 19, " $\nabla^2 f^* == \nabla \cdot g^*$ over $\Omega$ with $f^*|\Omega == f|\partial\Omega$ " is corrected to
-- $\nabla^2 f^* = \nabla \cdot g^*$ over $\Omega$ with $f^*|\Omega = f|\partial\Omega$ --

COLUMN 18 LINE 65
In claim 19, "where φ $\Omega$ symbolizes" is corrected to -- where $\partial\Omega$ symbolizes --

COLUMN 19 LINE 65
In claim 26, "where φ $\Omega$ symbolizes" is corrected to -- where $\partial\Omega$ symbolizes --

COLUMN 20 LINE 59
In claim 39, " $\nabla^2 f^* == \nabla \cdot g^*$ over $\Omega$ with $f^*|\Omega == f|\partial\Omega$ " is corrected to
-- $\nabla^2 f^* = \nabla \cdot g^*$ over $\Omega$ with $f^*|\Omega = f|\partial\Omega$ --

COLUMN 20 LINE 60
In claim 39, "where φ $\Omega$ symbolizes" is corrected to -- where $\partial\Omega$ symbolizes --

COLUMN 22 LINE 27
In claim 47, "where φ $\Omega$ symbolizes" is corrected to -- where $\partial\Omega$ symbolizes --

COLUMN 22 LINE 36
In claim 48, " $\nabla^2 f^* == \nabla \cdot g^*$ over $\Omega$ with $f^*|\Omega == f|\partial\Omega$ " is corrected to
-- $\nabla^2 f^* = \nabla \cdot g^*$ over $\Omega$ with $f^*|\Omega = f|\partial\Omega$ --

COLUMN 22 LINE 38
In claim 48, "where φ $\Omega$ symbolizes" is corrected to -- where $\partial\Omega$ symbolizes --

Signed and Sealed this
Seventeenth Day of February, 2015

Michelle K. Lee
*Deputy Director of the United States Patent and Trademark Office*